T. F. MULLIGAN.
LIQUID METER.
APPLICATION FILED JAN. 16, 1911.
1,168,537. Patented Jan. 18, 1916.
2 SHEETS—SHEET 2.
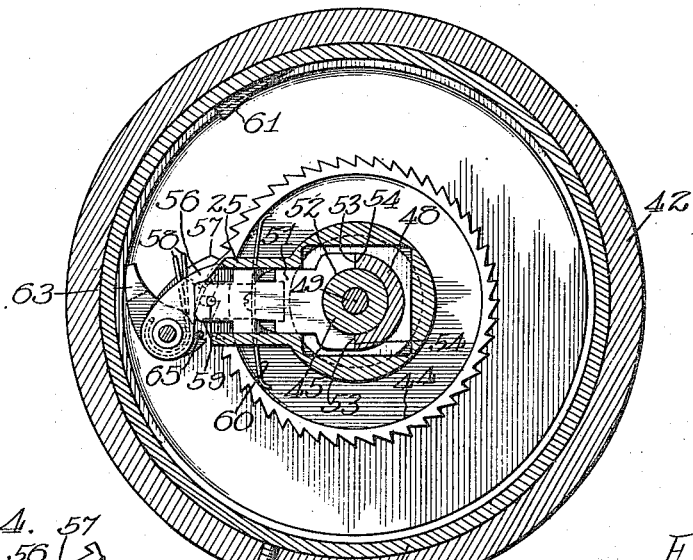
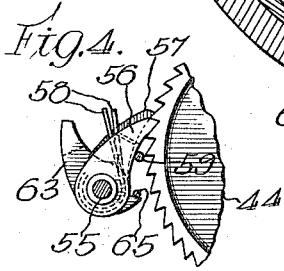
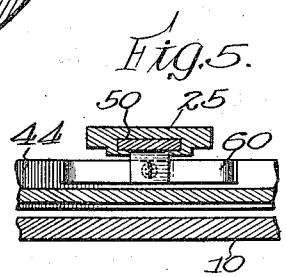
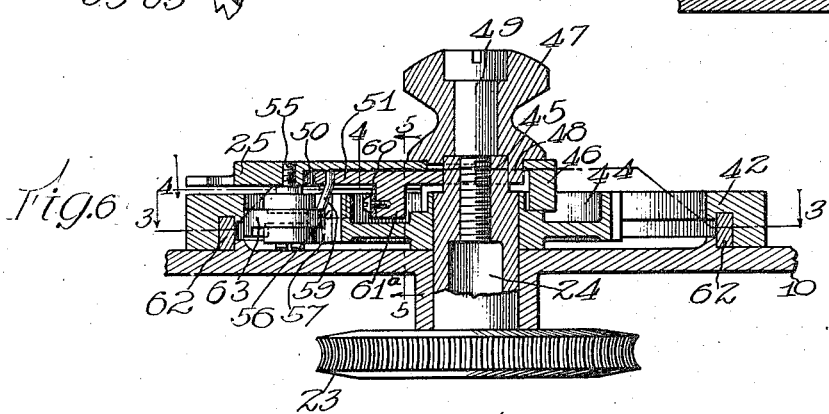
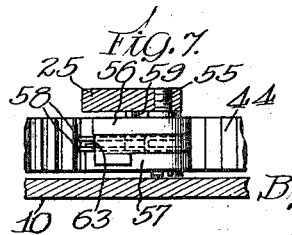
Witnesses:
Inventor:
Thomas F. Mulligan
By Brown & Hopkins
Attys

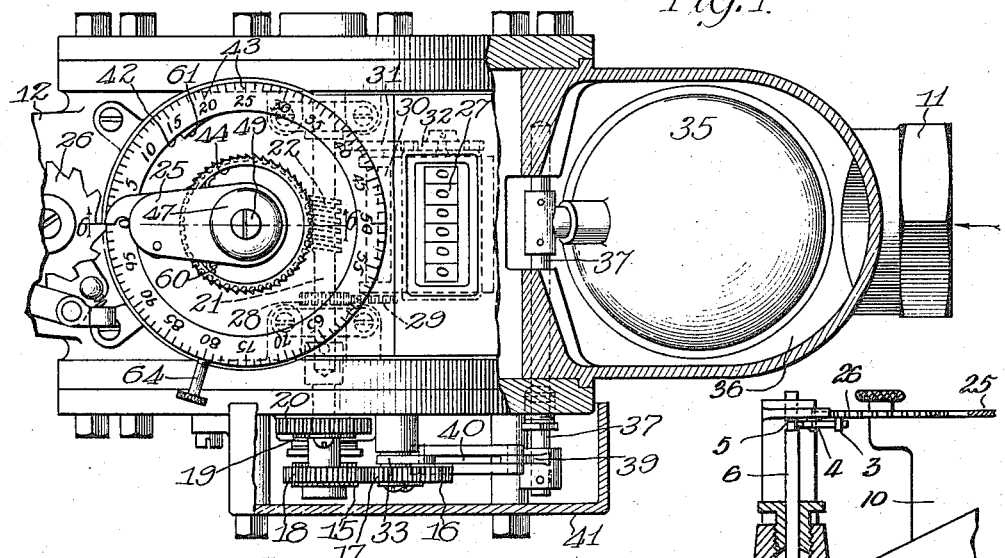

UNITED STATES PATENT OFFICE.

THOMAS F. MULLIGAN, OF FORT WAYNE, INDIANA, ASSIGNOR TO S. F. BOWSER & COMPANY, INCORPORATED, OF FORT WAYNE, INDIANA, A CORPORATION OF INDIANA.

LIQUID-METER.

1,168,537.  Specification of Letters Patent.  Patented Jan. 18, 1916.

Application filed January 16, 1911. Serial No. 602,826.

*To all whom it may concern:*

Be it known that I, THOMAS F. MULLIGAN, a citizen of the United States, residing at Fort Wayne, in the county of Allen and State of Indiana, have invented certain new and useful Improvements in Liquid-Meters, of which the following is a specification.

This invention relates to improvements in meters for measuring liquids, particularly oils and the like, and which meter is adapted to be actuated by the passage of the liquid therethrough.

Heretofore considerable difficulty has been experienced with meters of the character known as "pipe line meters" in that the meter is frequently actuated by the passage of air therethrough instead of by the liquid, with the result that the registering mechanism will not indicate the exact amount of liquid which has passed through the meter.

To obviate these difficulties and the objections and to provide an improved meter having means whereby the registering mechanism will be controlled by the supply of liquid and will be automatically rendered inactive when the supply of liquid fails, is the primary object of this invention.

A further object is to provide an improved device of this character having trip mechanism whereby the supply of liquid may be cut off from the "line" when a predetermined amount has been supplied thereto.

A further object is to provide an improved meter of this character of large capacity and in which the parts are compactly arranged, whereby a meter of the minimum size may be obtained.

A further object is to provide an improved device of this character which will be simple, durable and cheap in construction and effective and efficient in operation.

To the attainment of these ends and the accomplishment of other new and useful objects, as will appear, the invention consists substantially in the features of novelty hereinafter more fully described and claimed, and shown in the accompanying drawing exemplifying the invention, and in which—

Figure 1 is a top plan view, partly in elevation and partly in section, of an improved meter of this character constructed in accordance with the principles of this invention. Fig. 2 is a side elevation of the device shown in Fig. 1, partly in elevation and partly in section and with parts broken away, and showing in full lines the parts in the position they assume when the register mechanism is thrown out of operation, and in dotted lines the position they assume when the register is thrown into operation. Fig. 2ª is a sectional view of a valve controlled by the register mechanism. Fig. 3 is a horizontal sectional view taken on line 3—3, Fig. 6. Fig. 4 is a detail sectional view taken on line 4—4, Fig. 6. Fig. 5 is a sectional view taken on line 5—5, Fig. 6. Fig. 6 is a sectional view taken on line 6—6, Fig. 1. Fig. 7 is a left hand elevation of Fig. 4.

Referring more particularly to the drawing the numeral 10 designates generally a meter casing having an inlet 11 and an outlet 12. Within the casing is a rotary element, the wings of which are designated generally by the reference numeral 13 and which are adapted to be rotated by the fluid passing through the meter in the manner set forth in an application of Allen A. Bowser, filed June 19, 1908, Serial No. 439,397. The outlet 12 from the casing leads to a valve mechanism of a structure similar to that illustrated in the application just referred to. The wings or blades of the element are connected with an axle 14 which latter projects through one side of the casing 10 and has secured thereto a gear 15. This gear 15 is connected through the intermediate gears 16, 17, 18, 19 and 20, to a shaft 21 on which the gear 20 is secured, and a worm 22 (see Fig. 1) on the shaft meshes with a worm gear 23 on a shaft 24, which latter supports the arm 25 in a manner hereinafter set forth and which arm acts upon the tripping mechanism 26 in a manner similar to that set forth in the application above referred to, so that when the liquid is flowing through the meter the latter will be operated through the blades 13 and thereby rotate the arm 25, which latter will act upon the valve tripping mechanism 26. The tripping mechanism and valve may be of any well known construction, and in the present invention embodies a valve 9 with a spring 8 tending to seat the valve on its seat 7 in the casing 10. Separate from the valve but having a recessed end to contain one end of the valve stem is a rod 6 having a groove 5 adapted to be engaged by a lever 4 for holding the rod 6 and the valve downwardly against the pressure of the spring 8 in open position, as shown in Fig. 2ª. This lever 4 is adapted to be engaged by a projection 3 on the tripping mechanism 26. When the projection 3 of the tripping mechanism engages the lever 4 it is moved out of the groove 5 and the spring 8 acts to seat the valve. These blades of the meter also serve to actuate the register mechanism 27 for indicating the amount of liquid which passes through the meter and for this purpose there is provided an additional gear 28 on the shaft 21 which meshes with a gear 29 on a counter shaft 30. A gear 31 on the shaft 30 meshes with the operating mechanism 32 of the register 27 for imparting motion to the number bearing members thereof.

In order to prevent the meter from being actuated by air passing therethrough, the gear 16 is mounted upon a swinging arm or support 33, which latter moves about a fixed pivot 34. It will thus be apparent that when the gear 16 is in mesh with the gear 15 and liquid is flowing through the meter, the registering mechanism will be actuated, and will continue to be actuated while liquid is passing through the meter by being drawn or forced therethrough. In order to automatically shift this gear 16 out of mesh with the gear 15 so as to throw the register 27 out of operation when the supply of liquid ceases but to permit the blades 13 to rotate by the passage of air through the meter, to prevent damage, while at the same time cutting out the register, there is provided a float 35 which is controlled by the height or supply of the liquid, and this float controls the position of the gear 16 in a manner which will now be described. The valve casing 10 adjacent the inlet opening 11 is provided with a chamber 36 within which the float 35 is located, and if desired this chamber may be provided with a removable bottom 36ª by means of which the float may be removed or any sediment or foreign matter may be cleaned from the chamber. This float 35 is connected to a rock shaft 37 extending transversely across the valve casing and which shaft is journaled in suitable supports. One extremity of the shaft preferably projects beyond one face of the casing and is provided with a crank arm 39. A link 40 is connected at one extremity to the crank arm 39 and at its other extremity to the arm or support 33 and is of such a length that when the float 35 stands in proximity to the bottom of the chamber 36, the crank arm 39 will cause the link 40 to shift the arm or support 33 about its pivot 34 to move the gear 16 out of mesh with the gear 15 and when the float is elevated to the proper distance by the presence of a sufficient amount of liquid in the chamber 36, the crank arm 39 will be shifted in the opposite direction to cause the link 40 to move the arm or support 33 about its point of pivotal support 34 in the opposite direction to move the gear 16 into mesh with the gear 15. The link 40 is of such a length that when the parts assume the positions shown in dotted lines in Fig. 2, the points of pivotal connection of the link with the arm 39 and support 33 will be in a substantially straight line with the shaft 37 to hold the gear 16 in a position to coöperate with gear 15. The crank arm 39, link 40 and the connecting gears are preferably located on the outside of the casing and a cover 41 is provided for protecting these parts.

The shaft 24 is journaled in a suitable bearing in the top of the casing and projects beyond the upper face thereof, as shown more clearly in Fig. 6. An annular flange or member 42 surrounds the projecting extremity of the shaft 24 and is secured to the upper face of the top of the casing. The upper face of this annular member 42 is provided with graduations 43 forming an index or indicator by means of which a predetermined amount may be indicated so that when the indicated amount has been discharged through the meter the tripping mechanism 26 will be actuated in a manner similar to that shown in the application above refered to.

Secured to the shaft 24 for rotation therewith and within the annular member 42 is a ratchet disk or wheel 44 having peripheral teeth, which latter are of some width. The arm 25 is provided with an aperture of a diameter somewhat larger than the diameter of the adjacent portion of the shaft 24 and the extremity 45 of the shaft projects into this aperture. The arm is also provided with a depending flange 46 surrounding the adjacent portion of the shaft and also a portion of the hub of the ratchet disk or wheel 44. An operating handle or knob 47 is provided with a depending semi-circular portion 48 which surrounds the adjacent portion of the shaft 24 and projects through the aperture in the arm 25, and a fastening device 49, such as a screw, bolt or the like, is provided for securing the knob or handle 47 to the shaft 24 and also for holding the arm 25 against displacement. A guide or way 50 is provided on the arm 25 and opens through the lower face thereof and mounted to slide loosely therein is a member 51 provided with a bifurcated portion 52 in one end thereof. This bifurcated portion is adapted to receive a portion of the extremity 45 of the shaft 24 and the extremities 53 of this bifurcated portion abut and coöperate with the shoulders 54 formed by the ends of the semi-circular depending portion 48 of the knob or handle 47.

Pivotally supported by the arm 25 and located in the space between the annular member 42 and the periphery of the toothed or ratchet wheel 44 and by means of the pivot pin or member 55 are a pair of dogs 56, 57, one of which is slightly longer than the other. These dogs are arranged one above the other and are both adapted to act upon the peripheral teeth of the ratchet wheel member or wheel 44, which latter are of sufficient width to permit both of the dogs to act thereon. The extremities of these dogs are held normally in engagement with these teeth by means of elastic members 58. By means of these dogs 56, 57, and the disk or ratchet wheel 44 the arm 25 will be locked to the shaft 24 for rotation therewith, inasmuch as the ratchet disk or wheel 44 is itself locked or secured to the shaft 24 for rotation therewith.

The arm 25 is adapted to be adjusted by means of the knob or handle 47 to any desired position with respect to the graduations 43 so that the meter will operate to discharge the predetermined quantity, during which operation the blades 13 will be rotated by the liquid passing therethrough and the shaft 24 rotated in the manner already described to cause the arm 25 to advance toward the tripping mechanism 26 and when the extremity of the arm engages this tripping mechanism the latter will be operated in a manner and for the purpose as set forth in the application above referred to. In order therefore to permit the arm 25 to be moved in a direction opposed to the teeth on the ratchet disk or member 44 it is necessary to remove the extremities of the dogs 56, 57 to such an extent that they will pass over the ratchet teeth. This is accomplished by rotating the handle or member 47 about the fastening bolt 49 in one direction or the other and this rotary motion will cause the shoulders 54 of the semi-circular depending portion 48 to force the member 51 forwardly in the guide or way 50 and to move a projection 59 on said member, and which extends across the dogs 56 and 57, into engagement with the dogs and thereby move their extremities into positions in which they will not engage the teeth of the ratchet so that the arm 25 may be moved in a direction opposed to the teeth. An elastic member 60 is provided which may be secured to a shoulder 61ª on the member 51 and the extremities of this elastic member are adapted to engage an annular flange or face on the ratchet member 44 so that its tension will tend normally to move the member 51 in the guide or way 50 in a direction to move the projection 59 away from the dogs 56, 57, and thereby permit the elastic members 58 to move the extremities of the dogs into engagement with the ratchet teeth.

By providing a ratchet member 44 having wide teeth, and by the provision of the two dogs 56, 57, one above the other, and one of which is slightly longer than the other, it will be apparent that the extremities of the dogs will alternately act upon each of the teeth of the ratchet and with this arrangement it is possible to provide an indicator having graduations 43 corresponding to, for example, say, one hundred gallons, while the ratchet member 44 need be provided with only fifty teeth.

In order to permit the ready adjustment of the arm 25 in the manner already set forth so that the arm may be quickly set without danger of passing beyond the predetermined point on the indicator, and in order to insure the accurate setting of the arm each time without necessitating several adjustments, a stop 61 is provided which is preferably formed on an annular member 62, which latter is mounted in a suitable guide or way in the annular member 42 and this stop 61 projects into the path of movement of a yielding member 63 which latter is also supported by the arm 25 and is preferably acted upon by the elastic members 58. These elastic members tend normally to hold the member 63 against the inner face of the annular member 62 so that when the dogs 56, 57, are released to permit the arm 25 to be moved by the handle or knob 47, the stop 61 will be engaged by the member 63 to limit this adjustment of the arm 25. A suitable fastening device 64 may be provided for securing the ring 62 and the stop 61 in its adjusted position. The position of the ring 62 and its stop may be adjusted by loosening the fastening device 64 and rotating the ring by means of the finger of an operator, or any suitable article, inserted under annular member 42 in contact with the stop 61. It will thus be seen that when the stop 61 is adjusted and secured in position, and after each operation of the meter, the operator may readily and quickly throw the arm 25 back to its starting position or to a position so that a predetermined amount of liquid may be passed through the meter. The arm 25 however, is adapted to pass the stop 61 in the opposite direction, one or more times, and this is accomplished by means of the yielding stop 63, that is to say, this stop 63 will yield when the arm 25 is advanced to move it in a direction to trip the meter, by the ratchet disk or member 44. A stop 65 may be provided for limiting the movement of the yielding member 63 in a direction toward the annular member 62 and serves as a means whereby undue friction will be prevented between the member 63 and the member 62. Stops 66, 66, are also provided between which the support 33 is adapted to move and serve as means for limiting the movement thereof under the influence of the float 35.

It is thought that the operation of this improved device will be clearly understood but briefly stated is as follows: The liquid is caused to flow through the meter either by means of suction or by gravity, or it may be forced through the meter. As the liquid flows into the inlet opening 11 of the meter casing it will enter the chamber 36 and will accumulate therein to an extend sufficient to raise the float 35 until the gear 16 is moved into mesh with the gear 15. So long as this amount of liquid remains in the chamber 36 the gear 16 will be held in mesh with the gear 15 but should the liquid in the chamber 36 fall below the required amount, the float 35 will also fall and this movement of the float will automatically move the gear 16 out of mesh with the gear 15, thereby rendering the register mechanism inactive while the blades 13 may be rotated without affecting the registering mechanism.

What is claimed as new is:

1. In a liquid meter, the combination of a casing, a rotatable element therein, said element being rotatable by the passage of the liquid through the casing, a register, means connecting the rotary element with the register for operating the latter, a chamber in the casing adjacent the inlet thereof, a float in the chamber, means operatively related to the float and the said connecting means for controlling the register, said chamber having an opening in one wall through which access may be had to the float, and a removable closure for said opening.

2. In a liquid meter, the combination of a rotary piston, a register, means operatively connecting the piston with the register and embodying as a component part a shiftable gear, and means controlled by the height of the liquid in the meter for shifting said gear to render the register active or inactive.

3. In a liquid meter, the combination of a rotary piston, a register, means operatively connecting the piston with the register and embodying as a component part a shiftable gear, and a float controlled by the supply of liquid for shifting the gear to control the register.

4. In a liquid meter, the combination of a rotary piston, a register, a gear connection between the said piston and register for operating the latter, said connection including as a component part a gear shiftable into and out of mesh with its coöperating gear, and means controlled by the height of the liquid in the meter for automatically shifting the shiftable gear.

5. In a liquid meter, the combination of a rotary piston, a register, a gear connection between the said piston and register for operating the latter, said connection including as a component part a gear shiftable into and out of mesh with its coöperating gear, and a float controlled by the liquid for automatically shifting the shiftable gear.

6. In a liquid meter, the combination of a rotary piston, a register, a gear connection between said piston and register for operating the latter, said connection including as a component part a shiftable gear, a movable element supporting said shiftable gear, and means operatively connected with said movable element and controlled by the height of the liquid in the meter for automatically moving the latter to shift the gear supported thereby into and out of mesh with the coöperating gear.

7. In a liquid meter, the combination of a rotary element, a register, a gear connection between said element and register for operating the latter, said connection including a shiftable gear, a movable element supporting said shiftable gear, and a float within the meter casing operatively connected with the said movable element for moving the latter to shift the gear supported thereby into and out of mesh with the coöperating gear.

8. In a liquid meter, the combination of a rotary element, a register, a gear connection between the said element and register for operating the latter, said connection embodying a gear shiftable into and out of mesh with its coöperating gear, a support for the shiftable gear, a float controlled by the liquid for automatically shifting said shiftable gear, and a link connection between the float and gear support, said connection also serving as a positioning holder for the shiftable gear.

9. In a liquid meter, the combination of a rotary element, a register, a gear connection between the said element and register for operating the latter, said connection embodying a gear shiftable into and out of mesh with the coöperating gear, a swinging support for the shiftable gear, a float controlled by the liquid for automatically shifting said support and gear, and a link connection between the float and support, said connection serving as a positioning holder for the swinging support.

10. In a liquid meter, the combination of a rotary element, a register, a gear connection between the said element and register for operating the latter, said connection embodying a gear shiftable into and out of mesh with its coöperating gear, a swinging support for the shiftable gear, stops between which the support moves, a float controlled by the liquid for automatically shifting said support and gear, and a link connection between the float and support, said connection serving as a positioning holder for the swinging support.

In testimony whereof I have signed my name to this specification, in the presence of two subscribing witnesses, on this 11th day of January A. D. 1911.

THOMAS F. MULLIGAN.

Witnesses:
HARRY J. BRADLEY,
FRANK P. ELLIOTT.